(12) United States Patent
Pathak et al.

(10) Patent No.: US 10,831,454 B2
(45) Date of Patent: Nov. 10, 2020

(54) METHOD AND APPARATUS FOR EXECUTING DEVICE MONITORING DATA-BASED OPERATIONS

(71) Applicant: Rapyuta Robotics Co., Ltd, Tokyo (JP)

(72) Inventors: Alankrita Pathak, Tokyo (JP); Dhananjay Sathe, Tokyo (JP); Hitesh Sethi, Tokyo (JP)

(73) Assignee: RAPYUTA ROBOTICS CO., LTD., Tokyo (JP)

( * ) Notice: Subject to any disclaimer, the term of this patent is extended or adjusted under 35 U.S.C. 154(b) by 53 days.

(21) Appl. No.: 16/034,945

(22) Filed: Jul. 13, 2018

(65) Prior Publication Data
US 2019/0089597 A1 Mar. 21, 2019

Related U.S. Application Data

(60) Provisional application No. 62/559,938, filed on Sep. 18, 2017.

(51) Int. Cl.
*G06F 8/35* (2018.01)
*G06F 8/61* (2018.01)
(Continued)

(52) U.S. Cl.
CPC .............. *G06F 8/35* (2013.01); *G06F 8/63* (2013.01); *G06F 8/71* (2013.01); *G06F 9/542* (2013.01); *G06F 9/546* (2013.01); *G06F 11/3006* (2013.01); *G06F 11/3476* (2013.01); *H04L 12/2854* (2013.01); *H04L 41/082* (2013.01);
(Continued)

(58) Field of Classification Search
CPC ...... G06F 8/35; G06F 8/63; G06F 8/71; G06F 9/542; G06F 9/546; G06F 11/3006; G06F 11/3476; G06F 2201/835; H04L 12/2854; H04L 41/082; H04L 41/142; H04L 41/5051; H04L 41/5096; H04L 41/0853; H04L 63/101; H04L 63/093; H04L 63/0823; H04L 67/10; H04L 67/12; H04L 67/125; H04L 67/2809; H04L 67/34
See application file for complete search history.

(56) References Cited

U.S. PATENT DOCUMENTS

| 10,046,228 B2 * | 8/2018 | Tran ......................... H04L 1/00 |
| 2015/0052443 A1 * | 2/2015 | Funase .................. G06F 3/0484 715/736 |

(Continued)

*Primary Examiner* — Blake J Rubin
(74) *Attorney, Agent, or Firm* — Trupti P. Joshi

(57) ABSTRACT

A system and method to manage a plurality of devices has been described. Initially a device manager server in a cloud device management system, sends a selection of one or more device monitoring parameters to retrieve device monitoring data from a device from the plurality of devices. Next a device monitoring data is received corresponding to the selected one or more device monitoring parameters retrieved from the device and stored in a log database, and a metric database at the cloud device management system. Next one or more device monitoring data-based operations are executed at the cloud device management system based on the device monitoring data stored at the log database and the metric database. Finally, the result of execution is displayed at a console of the cloud device management system.

21 Claims, 6 Drawing Sheets

(51) Int. Cl.
    *H04L 29/08*   (2006.01)
    *G06F 8/71*    (2018.01)
    *H04L 12/24*   (2006.01)
    *G06F 9/54*    (2006.01)
    *G06F 11/30*   (2006.01)
    *G06F 11/34*   (2006.01)
    *H04L 29/06*   (2006.01)
    *H04L 12/28*   (2006.01)

(52) U.S. Cl.
    CPC ........ *H04L 41/142* (2013.01); *H04L 41/5051* (2013.01); *H04L 41/5096* (2013.01); *H04L 63/101* (2013.01); *H04L 67/10* (2013.01); *H04L 67/12* (2013.01); *H04L 67/125* (2013.01); *H04L 67/2809* (2013.01); *H04L 67/34* (2013.01); *G06F 2201/835* (2013.01); *H04L 41/0853* (2013.01); *H04L 63/0823* (2013.01)

(56) References Cited

U.S. PATENT DOCUMENTS

| | | | | |
|---|---|---|---|---|
| 2015/0095789 A1* | 4/2015 | Hyde | H04L 41/22 | 715/738 |
| 2015/0188949 A1* | 7/2015 | Mahaffey | H04L 63/20 | 726/1 |
| 2015/0281337 A1* | 10/2015 | Samson | H04L 67/10 | 709/201 |
| 2015/0281453 A1* | 10/2015 | Maturana | G05B 23/0213 | 379/265.12 |
| 2016/0031081 A1* | 2/2016 | Johnson | H04L 9/0866 | 700/250 |
| 2016/0232116 A1* | 8/2016 | Bone | G06F 9/4401 | |
| 2017/0063566 A1* | 3/2017 | Seminario | H04L 12/2816 | |
| 2017/0063798 A1* | 3/2017 | Lapidous | H04L 63/0272 | |
| 2017/0272455 A1* | 9/2017 | Black | H04L 63/18 | |
| 2017/0353353 A1* | 12/2017 | Nicholas | H04W 4/50 | |
| 2018/0027006 A1* | 1/2018 | Zimmermann | H04L 63/0227 | 726/11 |
| 2018/0054490 A1* | 2/2018 | Wadhwa | H04L 63/06 | |
| 2018/0062919 A1* | 3/2018 | Justin | H04L 41/0803 | |
| 2018/0101163 A1* | 4/2018 | Raue | G06F 17/246 | |
| 2018/0188704 A1* | 7/2018 | Cella | G05B 11/32 | |
| 2018/0196702 A1* | 7/2018 | Artusio | G06F 9/5044 | |
| 2018/0196867 A1* | 7/2018 | Wiesmaier | G06F 9/52 | |
| 2018/0234509 A1* | 8/2018 | Shah | G06F 16/957 | |
| 2018/0259922 A1* | 9/2018 | Nill | H04L 12/2825 | |
| 2018/0356989 A1* | 12/2018 | Meister | G06F 11/2064 | |
| 2018/0357415 A1* | 12/2018 | Dhondse | G06F 21/554 | |
| 2019/0050414 A1* | 2/2019 | Maturana | G06F 8/38 | |
| 2019/0052630 A1* | 2/2019 | Lapidous | H04L 63/083 | |
| 2019/0089597 A1* | 3/2019 | Pathak | G06F 11/3006 | |
| 2019/0097835 A1* | 3/2019 | Bhat | G06F 21/41 | |
| 2019/0245856 A1* | 8/2019 | Irwan | G06F 15/16 | |
| 2019/0342170 A1* | 11/2019 | Pathak | H04L 67/34 | |
| 2019/0364492 A1* | 11/2019 | Azizi | H04W 4/029 | |

* cited by examiner

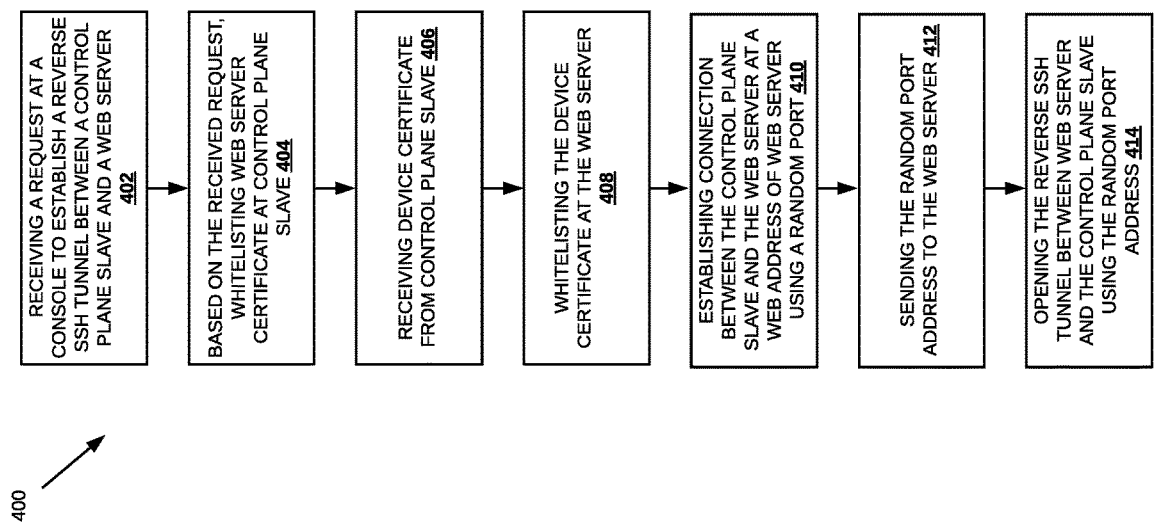

METHOD AND APPARATUS FOR EXECUTING DEVICE MONITORING DATA-BASED OPERATIONS

This application claims priority under 35 U.S.C. § 119(e) to provisional application No. 62/559,938 filed on Sep. 18, 2017, the contents of which are hereby incorporated by reference in their entirety.

TECHNICAL FIELD

The present invention relates generally to a device manager and more particularly to a device manager for managing a plurality of heterogeneous devices, including robots.

BACKGROUND

Internet of Things (IoT) and robotics are two areas that have grown exponentially in the past few years. IoT includes a network of devices that work in collaboration to perform a particular task. Similarly, in robotics several robots work in collaboration to perform a task.

In order to manage these devices, a system is required that allows a user to view data and logs generated by these devices and robots, and define actions corresponding to the data. Further, a system is also required that allows remote access to device for diagnosing and fixing issues with respect to the device and/or the robot.

BRIEF DESCRIPTION OF THE DRAWINGS

FIG. 4 is a detailed block diagram illustrating a process to remotely access a device from the cloud device management system, according to an embodiment;

DETAILED DESCRIPTION

Embodiments of techniques to provide a device manager are described herein. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

The device manager is provided for managing devices, including robots. A device is an object or a physical entity having a unique identifier and an ability to transfer data over internet. In one embodiment, the device is a 'thing' in the Internet of Things (IoT). A thing, in the IoT context, refers to an entity or physical object that has a unique identifier, an embedded system, and the ability to transfer data over a network. These devices may include physical devices, home appliances, vehicles, edge devices, fog devices, etc. The device also includes robots that can perform actuation and sensing along with other device functionalities.

Managing devices may include collecting device monitoring data related to the devices, defining events that include actions to be performed based on device monitoring data value, and/or generating statistics on device monitoring data. The device monitoring data includes measurement and other data collected on the devices. In one embodiment, the device monitoring data may either be log data or metrics data. A log data may include data record of events that occur in an Operating System (OS) or at software or hardware running on the device. The log data may be textual verbose messages. This log data may be used for analyzing and debugging software or hardware issues on the device. A metrics data is a scalar measurement with physical unit that changes over time. For example, temperature may be a metric data with physical unit, for example, degree Centigrade, Fahrenheit, measured by a device. The metrics data may be used for live monitoring and for long-term time-series data analysis.

Figure 1:
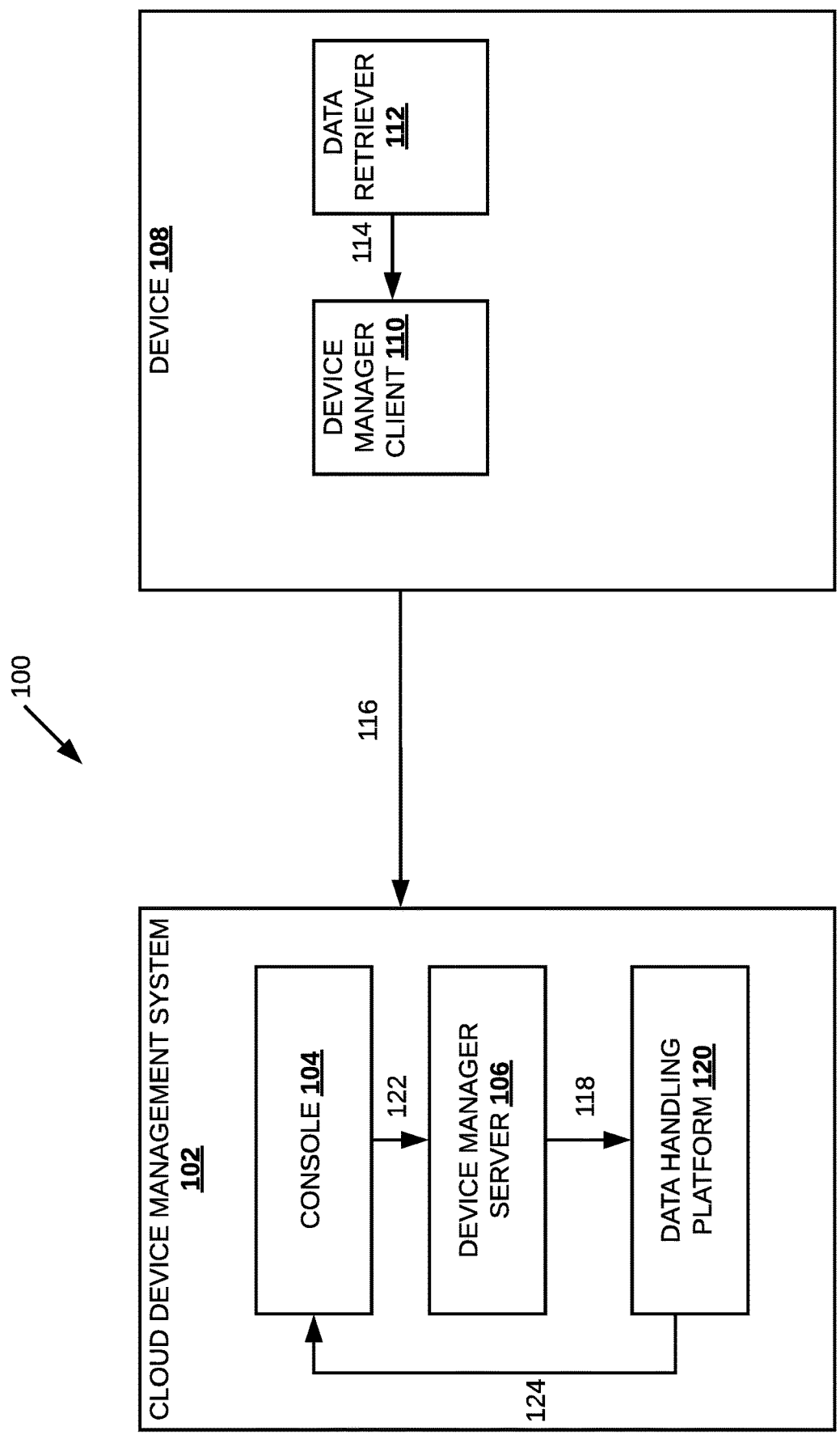
FIG. 1 is a exemplary block diagram illustrating a system to manage a plurality of devices, according to an embodiment.

FIG. 1 is a exemplary block diagram illustrating a system 100 to manage a plurality of devices, according to an embodiment. The system 100 includes a cloud device management system 102 that is a platform for deploying and executing software at cloud and different devices. The cloud device management system 102 is also used for managing devices, including robots. The cloud device management system 102 is a platform-as-a-service framework for cloud robotics solution provider. The cloud device management system includes one or more processors for processing data received at the cloud device management system and from the devices in communication with the cloud device management system. The cloud device management system also includes memory to store received or processed data.

In one embodiment, the cloud device management system 102 includes a console 104 to receive instructions for managing the devices and displaying device monitoring data collected from the devices. The cloud device management system 102 also includes a device manager server 106 that manages communication between the cloud device management system 102 and a device 108. For the sake of simplicity, only one device 108 is shown however any number of devices can be managed by the cloud device management system 102.

In order to manage the device 108, the device 108 has to be on boarded on to the cloud device management system 102. On boarding is the process of establishing communication between the device 108 and the cloud device management system 102 and installing components on the device 108 that allows the cloud device management system 102 to manage the device 108.

In one embodiment, during the on boarding process the device manager client 110 and a data retriever 112 are installed on the device 108. The device manager client 110 manages communication of device monitoring data from the device 108 to the cloud device management system 102. In one embodiment, the data retriever 112 retrieves device monitoring data of the device 108. The data retriever 112 may retrieve the device monitoring data from a hardware component, for example, a heat sensor, of the device 108 or a software component, for example an application executing on the device 108.

The data retriever 112 may retrieve the device monitoring data collected by Operating System (OS) or device middleware installed on the device 108. For example, when the device 108 has installed the Linux OS then the command $ man sensors can be executed to retrieve the device monitoring data, system temperature, of the device 108 on the data retriever. Similarly, when a Robot Operating System (ROS) middleware is installed on the device then one of the several communication mechanisms, for example, ROS topic, service or action, may be used for receiving the data from the device 108. To receive the device monitoring data, a hardware or software component of the device may publish the device monitoring data on a ROS topic. The data retriever 112 then subscribes to this topic to receive the device monitoring data. The data retriever 112 then sends 114 the device monitoring data to the device manager client 110 on the device 108.

The device manager client 110 then sends 116 the device monitoring data retrieved from the data retriever 112 to the cloud device management system 102. In one embodiment, the device manager server 106 at the cloud device management system 102 sends 118 the device monitoring data to a data handling platform 120. A data handling platform 120 includes several components to store and process the received device monitoring data. In one embodiment, the data handling platform 120 processes the device monitoring data based on the instructions 122 received from the console 104. The processed device monitoring data is then send to the console 104, which displays the processed device monitoring data. For example, the instruction 122 received from the browser 104 may be to generate statistics on the device monitoring data stored on the data handling platform 120. Based on the received instruction, the data handling platform 120 may generate a graph illustrating the change of device monitoring data that may finally be displayed at the console 104 of the cloud device management system.

In one embodiment, a user may also provide instruction 122 at the console 104 to define an event condition on the device monitoring data. The event condition may then be plugged in the data handling platform 120 by the device manager server 106 that receives the condition from the console 104. In one embodiment, the event condition includes a condition and an action to be performed when that condition is satisfied. For example, an event condition may be to raise an alarm (action) when a temperature of a device is more than 300 degrees (condition). The data handling platform 120 checks whether the event condition is satisfied and sends an instruction to the device manager server 106 to execute an action when the condition is satisfied.

In one embodiment, the device monitoring data stored in the data handling platform 120 also allows a user at the console 104 to select one or more devices to execute a mission. A mission includes a set of steps automatically performed by selected devices, for example robots, in a sequence to execute a task. For example, at the console 104 a device requirement, which may include processing speed, device capabilities, etc., may be received for performing a task. The data handling platform 120 may then select the devices that have device monitoring data matching with the condition received on the data handling platform 120. The selected devices may then be displayed at the console 104.

The proposed system 100 also supports remote access to the device 108 from a web server (not shown) at the cloud device management system 102. In order to remotely access the device, a reverse Secure Shell (SSH) tunnel (not shown) is opened between the device 108 and the web server that allows a user to access the device logs, execute shell command, and fix issues on the device from the console.

The proposed system 100 therefore allows a user to view device monitoring data, define events, select devices, and perform any remote device management activity from the web server 126.

Figure 2:
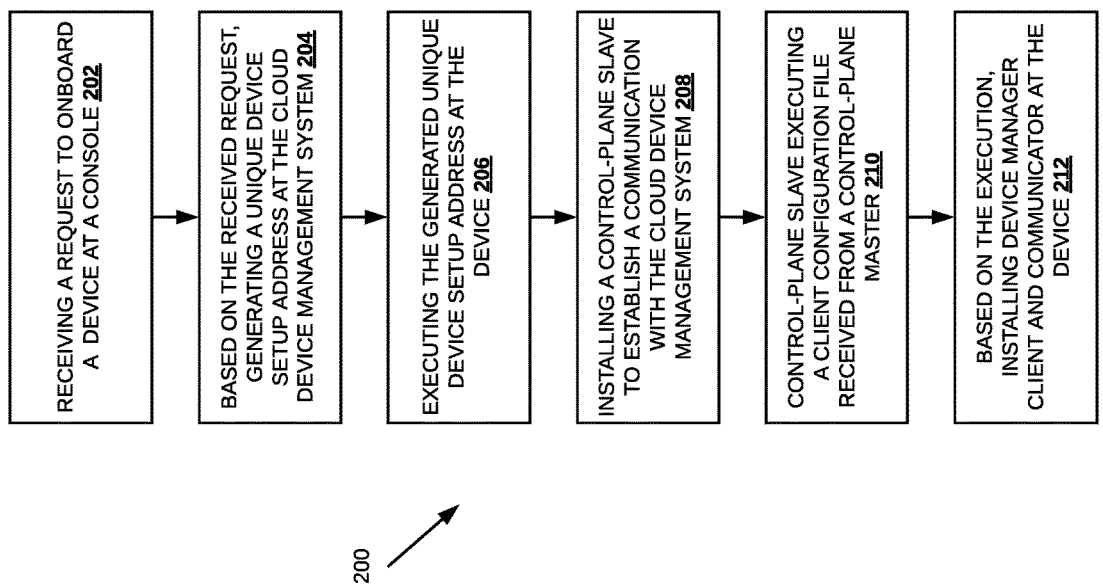
FIG. 2 is a block diagram illustrating a process to onboard a device at the cloud device management system, according to an embodiment.

FIG. 2 is a block diagram illustrating a process 200 to on board a device at the cloud device management system, according to an embodiment. The on boarding operation ensures that the device has the components required by the cloud device management system to manage the device. Initially, a cloud device management system receives a request to onboard a device at the console (202). The request to onboard the device may include providing a name and a description of the device at the console of the cloud device management system.

Next the cloud device management system generates a unique device setup address for onboarding the device, based on the received request (204). In one embodiment, the unique device setup address is a curl command for authenticating the device. For example, the generated unique device setup address may be: curl -H "Authorization:<token>". Client URL Request Library (CURL) is a command line tool for receiving and sending files using URL syntax. It consists of different curl commands and libraries which can work with different protocols. Next the generated unique device setup address is executed on the device (206). In one embodiment, the generated unique device setup address may be executed at a shell or Command Line Interface (CLI) of the device.

The downloaded unique device setup address also checks whether the device has the required Operating System (OS) and software components to allow retrieval of device monitoring data from the device. Further, the downloaded unique device setup address also validates the authorization token to verify the identity of the device. Based on the execution, a control plane slave is installed on the device to establish a communication with the cloud-device management system (208). A control plane slave is a part of a communication stack that includes a control plane master in the cloud device management system and a control plane slave on the device. The control plane slave automatically connects back to a control plane master at the cloud device management system.

In one embodiment, the control plane master acts as a central control bus for sending control messages to the control plane slaves installed in various devices. A control message is a message that the control plane master sends to the control plane slaves for executing an operation on the device. The operation may include selecting device monitoring parameters for retrieving the device monitoring data from the data retriever installed on the device and/or executing a command based on an event processed at the cloud device management system.

In one embodiment, dependencies of the control plane slave are also installed when the control plane slave is installed. The dependencies of the control plane slave may allow establishing a control plane channel for transferring control message from the control plane master to the control plane slave. Installing the dependencies of the control plane slave includes installing a transport layer that establishes a control plane channel for communication between the control plane master and the control plane slave. Installing the dependencies of the control plane slave also includes installing an encryption mechanism that encrypts control message sent from the control plane master to the control plane slave.

The control plane master and the control plane slave may be any master-slave communication node in which a slave registers with the master and receives instructions from the master. The transport layer dependency may be provided by any messaging mechanism including, for example ZeroMQ®. ZeroMQ® is a asynchronous messaging library used in distributed or concurrent applications. It provides a message queue that can run without a dedicated message broker. The encryption mechanism may be provided by any encryption mechanism including, for example pyCrypto® that is a collection of both secure hash functions (such as SHA256 and RIPEMD160), and various encryption algorithms (AES, DES, RSA, ElGamal, etc.)

During the onboarding, the device is also provided with a unique Device-ID, User-ID, and provisioning key enabling the device to establish a handshake between the control plane slave on the device and the control plane master at the cloud device management system. Further, during the onboarding the device is also included in a whitelist of devices that can communicate with the cloud device management platform.

Next the installed control plane slave executes a client configuration file received from a control plane master (210). A client configuration file is a file that includes a list of components to be installed on the device for managing the device. In one embodiment, the client configuration file represents desired state of the control plane slave. The control plane slave may receive the client configuration file from the control plane master executing at the cloud device management system.

Based on executing the client configuration file, a device manager client and a communicator are installed on the device (212). The instruction to install the device manager client, and the communicator may be included in the client configuration file. The device manager client is a component that manages communication between the different components on the device. In one embodiment, the device manager client is in communication with the control plane slave to receive and execute the control message from the control plane master installed at the cloud-device management system. The device manager client also retrieves the device monitoring data from a data retriever and then establishes a device monitoring data-plane to forward the device monitoring data to the cloud-device management system.

As discussed above, the data retriever retrieves the device monitoring data exposed by the device. The data retriever is in communication with the device manager client and transfers the received device monitoring data to the device manager client. A communicator is also installed on the device that is in communication with the device manager client. The communicator receives the device monitoring data from the device manager client and forwards the device monitoring data to the device management system. In one embodiment, communicator may be a plugin-driven server agent for collecting and reporting metrics and logs.

The communicator also has output plugins to send metrics and logs to a variety of other data stores, services, and message queues, for example, MQTT, NSQ, etc. In this case, the communicator sources in the metrics or logs device monitoring data from the device manager client and forwards the device monitoring data to a message broker at the cloud device management system.

Figure 3:
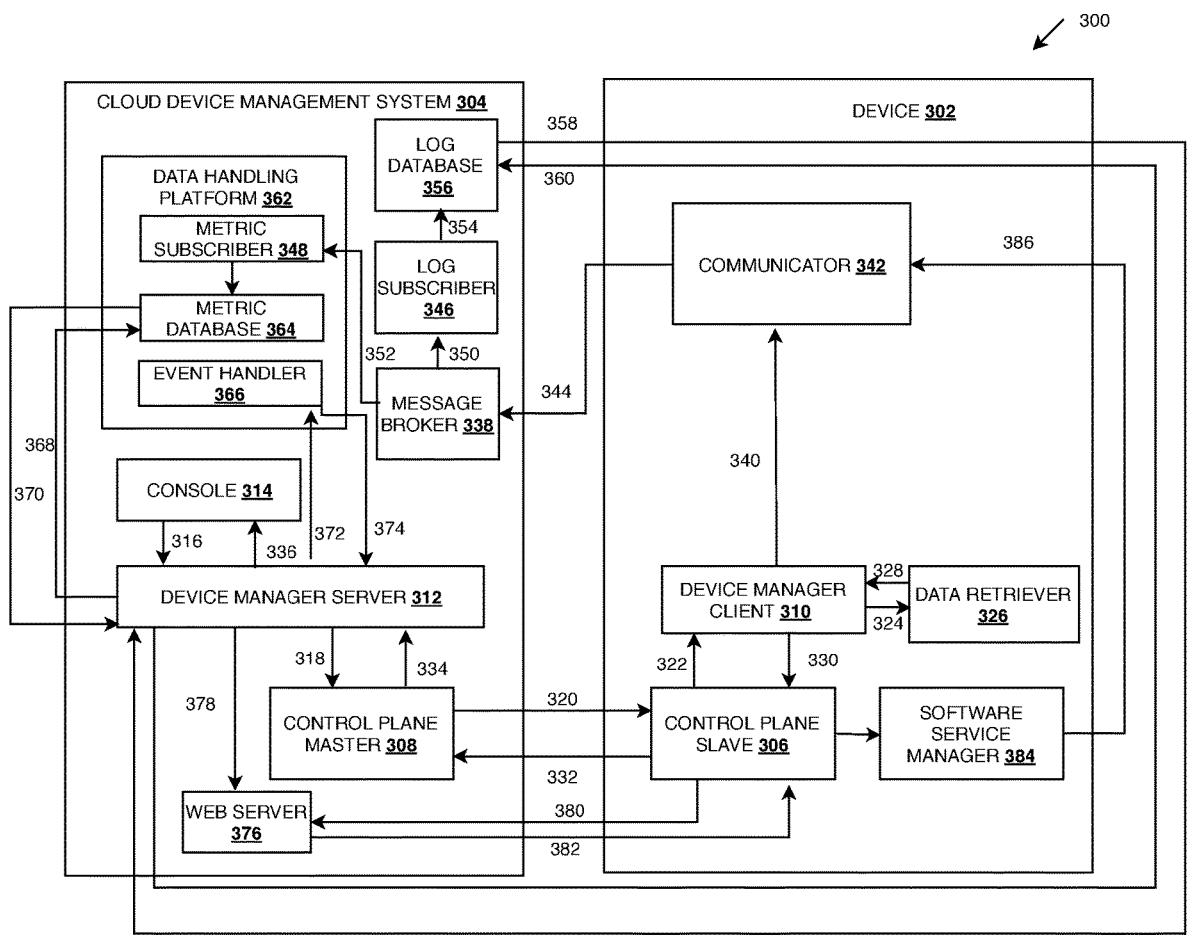
FIG. 3 is a flow diagram illustrating a system to manage a plurality of devices, according to an embodiment.

FIG. 3 is a detailed block diagram illustrating a system 300 to manage a plurality of devices, according to an embodiment. The system includes the device 302 and the cloud device management system 304. The device 302 includes a control plane slave 306 that is in communication with a control plane master 308 in the cloud device management system 304.

The control plane slave 306 is in communication with device manager client 310. Similarly, the control plane master 308 is in communication with the device manager server 312 at the cloud device management system 304. The device manager server 312 and the device manager client 310 manages the communication between the different components at the cloud device management system 304 and the device 302, respectively. In one embodiment, the device manager server 312 runs as a microservice. The cloud device management system 304 includes a console 314 that is a user interface to receive different instructions for managing devices, including device 302. The console 314 also displays the captured device monitoring data and different statistical data or visualization build on the device monitoring data.

For example, the console 314 may receive a request to determine the device monitoring parameters exposed by the device 302. The console 314 may send 316 this request to the device manager server 312 that sends 318 this request to the control plane master 308. The control plane master 308 then sends 320 this request as a control message to the control plane slave 306. The control message is send 320 from the control plane master 308 to the control plane slave 306 using the transport layer installed as a dependency of the control plane slave 306. The control message is encrypted before sending the control message from the control plane master 308 to the control plane slave 406.

In the example above, the control plane slave 306 then sends 322 the request to the device manager client 310. Finally, the device manager client 310 sends 324 the request to retrieve the device monitoring parameters to the data retriever 326. Based on the received request, the data retriever 326 sends 328 the device monitoring parameters list to the device manager client 310 that sends it to the console 314 using the route (330→332→334→336). In one embodiment, the control plane master 308 can send the device monitoring data parameter list directly to the console 314. At the console 314, the user can select the device monitoring parameters from the list that the user want to subscribe for listening to the corresponding device monitoring data. For example, a device may have exposed device monitoring parameters "temperature", "atmospheric moisture", and "altitude". These parameters are displayed at the console 314 and a user can select device monitoring parameters "temperature" and "altitude" as the parameters for receiving the device monitoring data.

A user can also define a device monitoring parameter classification of the selected device monitoring parameter at the console 314. In one embodiment, the selected device monitoring parameter may be classified as a log or a metric. The selected device monitoring parameters and their corresponding device monitoring parameter classification is send 316 from the console 314 to the device manager client 310 using route (316→318→320→322). The device manager client 310 then uses the stored selected device monitoring parameters for retrieving device monitoring data from the data retriever 326.

The device manager client 310 communicates with the data retriever 326 based on a publisher-subscriber model. In this case, the device manager client 310 subscribes to the selected device monitoring parameters for retrieving the corresponding device monitoring data from the data retriever 326. The device manager client 310 also retrieves a time stamp of the time when a particular device monitoring data is captured at the device. In case of metric data, the time stamp allows generating of statistical data indicating the change in metric data over a period of time. As discussed above, device monitoring parameter classification are received corresponding to the device monitoring parameters at the console 314. Next, the device manager client 310 generates a device monitoring metadata based on the received device monitoring parameter classification. The device monitoring metadata may be generated based on the device monitoring classification of the data received from data retriever 326. In one embodiment, the device monitoring metadata may be used to send device monitoring data to different clients at the cloud device management system 304. The clients may be subscribers that subscribe to receive data of a particular device monitoring classification type.

In one embodiment, the device monitoring metadata includes a tenant_id and a device_id which is common to all messages received from a device, and the defined device monitoring data classification of the device monitoring data parameter. The tenant_id is an identification of a user or company that is managing the devices. A device_id is an identification of the device or robot, for example device 302. In one embodiment, the device monitoring metadata may be provided in a format understood by the message broker 338. For example, when the message broker 338 is a Message Queuing device monitoring Transport (MQTT) broker then the device manager client 326 generates the device monitoring metadata as a "topic".

MQTT is a lightweight client/server messaging protocol based on a publish-and-subscribe interaction. With the publish and subscribe model, a publisher publishes information to the MQTT broker. Published information from a client is identified under one of a number of 'topics,' and other subscribers subscribe to the relevant topic and receive the information from the broker when the information is published or updated. In particular, the clients can subscribe specifically to those "topics" that are relevant to their own operation.

As discussed above, MQTT clients publish or subscribe data in the form of "topics." A topic is a UTF-8 string, consisting of one or more topic levels. Each topic level is separated by a forward slash (topic level separator). An individual topic resembles a directory path (for example, file system). For example, a topic including three topic levels x, y, and z may be represented as x/y/z. The device manager client 410 generates a device monitoring metadata for a MQTT message broker in the format: /tenant_id/device_id/device monitoring data parameter classification.

The device manager client 310 sends 340 the received device monitoring data, the time stamp, and the device monitoring metadata to a communicator 342. The communicator 342 then publishes 344 the device monitoring data and the device monitoring metadata as a topic for accessing the device monitoring data. The communicator 342 may publish the device monitoring metadata and the device monitoring data at a pre-designated port assigned at the message broker 338. In one embodiment, a subscriber may receive the device monitoring data using the corresponding device monitoring metadata. For example, a device monitoring data "30 degree Centigrade" may be published at a topic (device monitoring metadata tag)/xyz_corp/robot_1/metric/. In this case a subscriber can receive the device monitoring data "30 degree Centigrade" by subscribing to the topic (device monitoring metadata tag)/xyz_corp/robot_1/metric/.

As shown, the cloud device management system 304 includes two device monitoring data subscribers a log subscriber 346 and a metric subscriber 348. A log subscriber 346 is a device monitoring data subscriber that subscribes to device monitoring data having device monitoring parameter classification as "log". In order to subscribe to the log data the log subscriber subscribes to a device monitoring metadata/tenant_id/device_id/{telemetry property}log, receiving device monitoring data having classification "log", at the message broker 338. The log subscriber 346 may also use wildcards when subscribing to the device monitoring metadata. For example #/#/log may be used to receive log data from all the devices, having any tenant_id and device_id, onboarded to the cloud device management system 304. In this case, the wildcard # indicates that log data received from all tenants and devices are to be sent to the log subscriber 346. Similarly the metric subscriber 348 may subscribe to metric data using a device monitoring metadata #/#/metric. In one embodiment, the log subscriber 346 and the metric subscriber 348 are plugin-driven server agent, similar to the communicator, for collecting and reporting metrics.

Based on the subscribed device monitoring metadata, the log subscriber 346 and the metric subscriber 348 receives 350 and 352 the log data and the metric data, respectively, from the message broker 338. The log subscriber 346 sends 354 the log data to a log database 356. In one embodiment, a user can request log data for all the devices or a particular device at the console 314. The request received at the console 314 is sent 36 to the device manager server 312. The device manager server 312 then sends 358 the request to the log database 356 to retrieve the log data or execute a query on the log data. The log data corresponding to the request or based on executing the query is then retrieved from the log database 356 and send 360 to the device manager server 312 that sends the log data to the console 314 at which the log data is displayed.

The metric subscriber 348 is included in a data handling platform 362 that includes a metric database 364 and an event handler 366. The metric database 364 may be any time series database storing time stamped data. The event handler 466 may include any event processor that regularly checks whether an event condition is satisfied based on data stored in the metric database 364 and then sends a request for executing the action corresponding to the event when the metric data matches with the event condition.

The metric database 364 receives 368 the metric data from the metric subscriber 348. The metric data stored in the metric database 364 may be used for selecting a device based on the metric data and/or obtain statistics of device monitoring data. In one embodiment, a user can request viewing of statistical data on the metric data stored at the metric database 364. As discussed above, the metric data is a time-series data that changes over time. The statistical data may be a graph displaying the changes in the metric data over a time period. The request received at the console 314 is sent 316 to the device manager server 312.

The device manager server 312 then sends 368 the request to the metric database 364 to retrieve the metric data and the corresponding time stamp. The metric data and the corresponding time stamp is then send 370 from the metric database 364 to the device manager server 312 that finally sends 336 the metric data and the corresponding time stamp to the console 314 that renders the statistical data based on the received device monitoring data and the corresponding time stamp. In one embodiment, log data may also be retrieved from the log database 356 and rendered at the console 314.

A user at the console 314 may also request selection of devices based on a selection criteria. In this case, a check is performed to determine whether the metric data of any device stored in the metric database 364 matches with the selection criteria. In this case, the device that has a metric data matching with the selection criteria is displayed at the console 314. A user may then select a device from the displayed list of devices. For example, a user may want to select the device that has a remaining battery more than 60%. In this case, the metric data "remaining battery" of several devices stored at the metric database 364 is compared with the selection criteria "battery more than 60%" and the devices that have device monitoring data matching with the selection criteria are displayed at the console 314.

In one embodiment, the metric event handler 366 allows a user to set an event including a condition and an action to be performed when the condition is satisfied. A user may provide the event condition, including event definition and configuration of alarms and actions, at the console 314. The event condition from the console 314 is send 316 to the device manager server 312. The device manager server 312 sends 372 the event condition to the event handler 366. For example, an event may be defined to perform an action when battery level drops below 10%. The event handler 366 checks whether the event condition is satisfied and sends an instruction 374 to the device manager server 312 to execute an action, for example stop a device, active/deactivate device monitoring condition, included in the event when the condition in the event is satisfied.

As discussed above, a reverse SSH tunnel may also be generated between a device and a web server that allows a remote access of the device 402 from the web server 376 at the cloud device management system 304. A request may be received at the console 314 to open a reverse SSH tunnel. The console 314 then sends 316 a request to the device manager server 312 to whitelist the web server 376 certificate at the control plane slave 306. Based on the received request, the device manager server 312 sends 318 the stored web server certificate to the control plane master 308 that sends 320 the web server certificate to the control plane slave 306. The received web server is whitelisted at the control plane slave 306. Whitelisting the web server certificate allows the control plane slave 306 to establish a communication with the web server 376. In response, the control plane slave 306 sends 332 the device certificate to the control plane master 308 that sends 334 the device certificate to the device manager server 312.

The device manager server 312 sends 378 the received device certificate to the web server 376 that whitelists the device certificate. The control plane slave 306 then receive 320 a request to connect to the web server 376 at a particular web address. The control plane slave 306 then uses a random port to establish a connection 380 with the web server 376. A random port may be any unused port at the device that the control plane slave can use for communicating with the web server 376. The random port address is then send from the control plane slave 306 to the web server 376 using route (332→334→378). The web server then opens the SSH tunnel 382 using the received random port address. Based on the opened SSH tunnel, the web server can remotely view logs of device 302, execute shell commands at the device 302, and debug issues at the device 302.

In one embodiment, the system 300 also allows deploying of software service at the device 302 from the cloud device management system. A software service is a reusable service that provides one or more device related functionalities. For example, the software service may include navigation service or mapping service. In one embodiment, a request is received at the console 314 to deploy a software service at the device 302. Based on the received request, the software service is send 320 from the control plane master 308 to the control plane slave 306 that deploys the software service at the device 302. In one embodiment, the device 302 includes a software service manager 384 that manages execution of the software service (not shown) deployed at the device 302. In one embodiment, the software service manager 384 also sends 386 the logs of software process execution to the communicator 342 that then forwards it to the different subscribers at the cloud device management system 304. In one embodiment, the software service manager 384 is a software program that assist in running software services, for example Docker provided by Docker Inc.

FIG. 4 is a flow diagram 400 illustrating a process to remotely access a device from the cloud device management system, according to an embodiment. Remote access of the device allows a user to view device logs and/or execute any commands to debug the device. Typically a device is behind a firewall, a Network Address Translation (NAT), or an Intrusion Prevention System (IPS) and the access to the device by the cloud device management system is blocked. The current invention solves this problem by providing a reverse SSH tunnel for remote access to the device from A request is received at a console of the cloud device management system to establish a reverse SSH tunnel between control plane slave at the device and an web server at the cloud device management system (402). Secure Shell (SSH) is a cryptographic network protocol for operating network services securely over an unsecured network. The reverse SSH tunnel is based on the principle that a connection initiated from a device, behind the firewall, NATs, and IPS, to the web server cloud device management system is not blocked. Once the reverse SSH tunnel is opened, it can be used to provide remote access to the device from the web server cloud device management system. An web server is a software program which uses the secure shell protocol to accept connections from remote computers. [0055] Next based on the received request, the web server certificate is whitelisted at the control plane slave (404). A device certificate is then received from the control plane slave (406). The control plane slave forwards the device certificate to web server. The device certificate is then whitelisted at the web server (408). Next the control plane slave at the device establishes a connection with the web server at a web address of web server using a random port (410). The control plane slave then sends the random port address to the web server (412). Finally the reverse SSH tunnel is opened between the web server and the control plane at the shared random port address. Finally, based on the opened reverse-SSH channel the web server at the cloud device management system allows a user to access the device for monitoring logs and/or debugging the device (308).

Figure 5A:
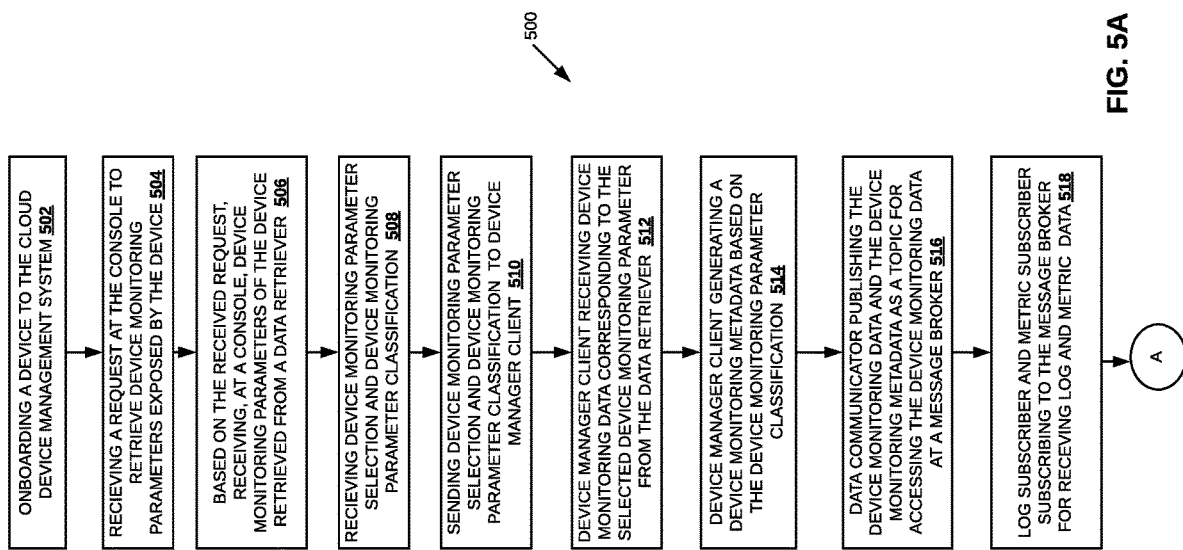
FIGS. 5A and 5B are flow diagrams illustrating a process to manage a plurality of devices, according to an embodiment.
Figure 5B:
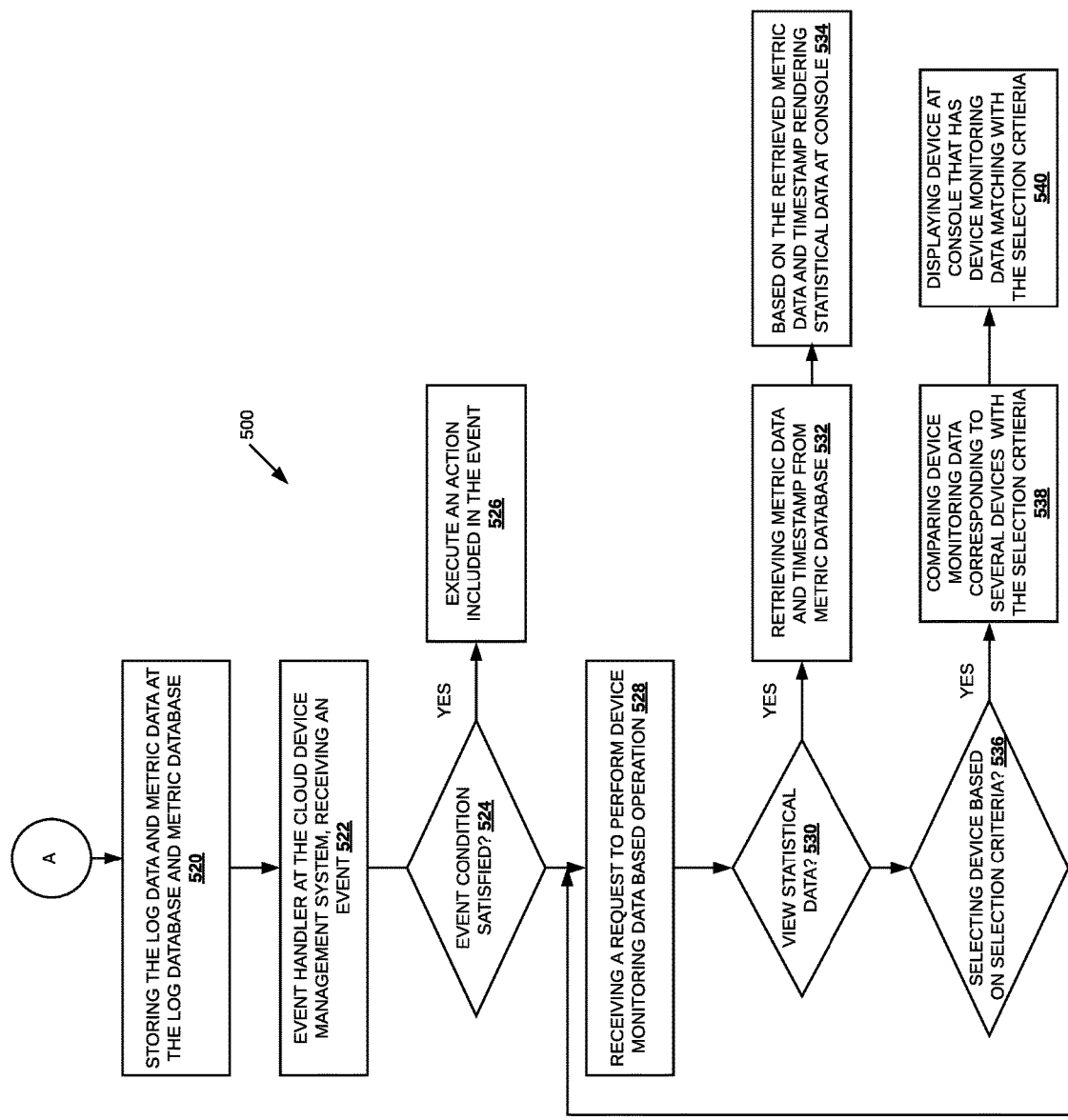

FIGS. 5A and 5B are flow diagrams illustrating a process 500 to manage a plurality of devices, according to an embodiment. Initially a device is onboarded to the cloud device management system (502). The device may be onboarded based on the process described in FIG. 2. Next a request is received at the console of the cloud device management system to receive device monitoring parameters exposed by the device (504). Based on the received request, the console receives the device monitoring parameters of the device retrieved by a data retriever on the device (506). Next, a device monitoring parameter selection, from the received device monitoring parameters, and a device monitoring parameter classification of the selected device monitoring parameters is received at the console of the cloud device management system (508).

Next device monitoring data parameter selection and a device monitoring data parameter classification is send to the device manager client from the console (510). The device manager client stores the selection and classification at the device manager client. Next the device manager client receives device monitoring data corresponding to the selected device monitoring data parameter from the data retriever (512). The device manager client also generates a device monitoring metadata based on the device monitoring data parameter selection (514). Next a communicator on the device publishes the retrieved device monitoring data and the device monitoring metadata as a topic for accessing the device monitoring data at a message broker on the cloud device management system (516). The message broker receives the device monitoring data and the device monitoring metadata from the device manager client.

A log subscriber and a metric subscriber subscribes to the message broker to receive log data and metric data, respectively (518). The log data and the metric data are stored in log database and metric database (520). An event handler at the cloud device management system receives an event (522). Next a check is performed to determine whether a condition included in the event is satisfied 524. In case the event condition is satisfied based on the metric data matching the event condition then an action included in the event in executed (526). The check to determine whether the condition in event in satisfied may be performed at regular intervals.

Next request is received at the console to perform a device monitoring data based operations (528). The device monitoring data based operations may include, for example, viewing the stored device monitoring data, statistical data on the device monitoring data, and/or executing an action corresponding to a condition in an event received at the metric event handler.

Next in case the device monitoring based operation is to view statistical data (condition in 530 is yes) then a metric data and the corresponding time stamp is retrieved from the metric database (532). Based on the retrieved metric data and the corresponding time stamp, statistical data is rendered at the console of the device management system (534). In case the device monitoring based condition is to select a device based on a selection criteria (condition in 536 is true) then the device monitoring data corresponding to several devices stored in the metric database is compared with the selection criteria (538). Based on the comparison, the device that have a telemetric data matching with the selection criteria is displayed at the console of the device management system (540).

The foregoing diagrams represent logical architectures for describing processes according to some embodiments, and actual implementations may include one or more components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code read from one or more of non-transitory computer-readable media, such as a floppy disk, a CD-ROM, a DVD-ROM, a Flash drive, a magnetic tape, and solid state Random Access Memory (RAM) or Read Only Memory (ROM) storage units and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Embodiments described herein are solely for the purpose of illustration. Those in the art will recognize other embodiments may be practiced with modifications and alterations to that described above.

The invention claimed is:

1. A computer implemented method to manage a plurality of heterogeneous devices, the method comprising: a device manager server at a cloud device management system, sending a selection of one or more device monitoring parameters from a plurality of device monitoring parameters exposed by a device, wherein the device is a robot; a message broker at the cloud device management system, receiving device monitoring data corresponding to the selected one or more device monitoring parameters exposed by the device, wherein the device monitoring data includes log data and metrics data, the log data and metrics data used for device monitoring data based operations, the log data including a data record of events that occur at least in one or more of an operating system, software, or hardware running on the device; based on a device monitoring parameter classification of the selected one or more device monitoring parameters, storing the device monitoring data in one of a log database and a metric database at the cloud device management system, wherein the device monitoring parameter classification includes at least one or more of a log and a metric type; at the cloud device management system, executing one or more device monitoring data based operations on the device monitoring data stored in at least one or more of the log database and the metric database; and displaying the result of execution at a console of the cloud device management system, wherein the cloud device management system includes a platform-as-a-service framework for cloud robotics solution provider.

2. The computer implemented method according to claim 1, further comprising: on the console at the cloud device management system, receiving a request to on board the device at the cloud device management system; based on the received request, generating a unique device setup address to on board the device on to the cloud device management system, wherein the unique device setup address includes an authorization token to verify identity of the device and determine whether the device has the required OS and one or more software components for retrieving the device monitoring data; based on the determination, executing the unique device setup address on the verified device; and based on the execution, installing a control plane slave on the device in communication with a control plane master at the cloud device management system, wherein installing the control plane slave on the device in communication with the control plane master at the cloud device management system includes: establishing a handshake between the control plane slave and the control plane master at the cloud device management system, and whitelisting the device for communication with the cloud device management system.

3. The computer implemented method according to claim 2, further comprising: executing a client configuration file at the control plane slave on the device; and based on the execution, installing, on the device, a device manager client in communication with the control plane slave, a software service manager to manage execution of software service deployed on the device, and a communicator to publish the device monitoring data to the message broker at the cloud device management system.

4. The computer implemented method according to claim 3, further comprising: a data retriever at the device, retrieving device monitoring data from the device; the device manager client, receiving the retrieved device monitoring data from the data retriever; at the device manager client, generating a device monitoring metadata based on the device monitoring parameter classification, wherein the device monitoring metadata includes an identifier for managing the device, the device monitoring metadata provided in a format recognized by the message broker; the communicator, publishing the device monitoring data and the device monitoring metadata as a topic for accessing the device monitoring data at the message broker; and a log subscriber and a metric subscriber, subscribing to the message broker for receiving the device monitoring data from the message broker at the cloud device management system.

5. The computer implemented method according to claim 4, wherein executing one or more device monitoring data based operation comprises: the device manager server, receiving a request to view statistical data for the metric data stored at the metric database; based on the received request, retrieving the metric data and corresponding time stamp from the metric database; and at the console, rendering the statistical data based on the retrieved metric data and the corresponding time stamp.

6. The computer implemented method according to claim 4, further comprising: at an event handler, receiving an event including an event condition and an action to be performed corresponding to the event; and the event handler, sending an execution instruction to execute the action included in the event when the stored device monitoring data matches the event condition.

7. The computer implemented method according to claim 4, wherein executing one or more device monitoring data based operation comprises: at the cloud device management system, receiving a device selection request to select a device from the one or more devices based on a device selection criteria; comparing the device selection criteria with the device monitoring data corresponding to the device stored in the log database and the metric database; and displaying the selected device at the console of the cloud device management system based on the comparison, wherein the device monitoring data based operations includes at least one or more of analyzing issues on the device, debugging issues on the device, live monitoring, and for long term time-series data analysis.

8. The computer implemented method according to claim 4, further comprising: the device manager server, sending a web server certificate of a web server to the control plane slave to whitelist the web server at the control plane slave; the control plane slave, sending a device certificate to whitelist the device at a web server included at the cloud device management system; the control plane slave, establishing a connection with the web server based on a web address of the web server using a random port address; sending the random port address to the web server; opening a reverse SSH-tunnel between the cloud device management system and the device using the random port address; and based on the opened reverse SSH-tunnel, providing the console a remote access to the device.

9. A system to manage a plurality of heterogeneous devices, the system comprising: a device manager client; a control plane slave in communication with the device manager client to forward control message to the device manager client; a data retriever in communication with the device manager client to retrieve device monitoring data from the device and provide the data to the device manager client, wherein the device is a robot; and a communicator to receive the data from the device manager client; and a cloud device management system comprising: a message broker to receive the device monitoring data from the communicator, wherein the device monitoring data includes log data and metrics data, the log data and metrics data used for device monitoring data based operations, the log data including a data record of events that occur at least in one or more of an operating system, software, or hardware running on the device; a log subscriber and a metric subscriber to receive the device monitoring data from the message broker; a log database to store the device monitoring data received at the log subscriber; and a metric database to store the device monitoring data received at the metric subscriber;

and at the cloud device management system, executing one or more device monitoring data based operations on the device monitoring data stored in at least one or more of the log database and the metric database; and displaying the result of execution at a console of the cloud device management system, wherein the cloud device management system is a platform-as-a-service framework for cloud robotics solution provider.

10. The system according to claim 9, wherein the cloud device management system further comprises: a device manager server; the console in communication with the device manager server to receive control message and device monitoring data processing instructions, wherein the control message includes a message for executing a command based on an event processed at the cloud device management system; a control plane master in communication with the device manager to send control message to the control plane slave; and a web server to establish a remote web-SSH communication with the control plane slave, wherein sending control message to the control plane slave includes:

installing a transport layer dependency to establish a channel for communication between the control plane master and the control plane slave; installing an encryption mechanism to encrypt control message sent from the control plane master to the control plane slave via the installed transport layer dependency;

transferring encrypted control message from the control plan master to the control plan slave.

11. A computer system to manage a plurality of heterogeneous devices, the system comprising: a memory to store instructions; and a processor to execute the instructions to: send a selection of one or more device monitoring parameters from a plurality of device monitoring parameters exposed by a device, wherein the device is a robot; receive device monitoring data corresponding to the selected one or more device monitoring parameters exposed from the device, wherein the device monitoring data includes log data and metrics data, the log data and metrics data used for device monitoring data based operations, the log data including a data record of events that occur at least in one of an operating system, software, or hardware running on the device; based on a device monitoring parameter classification of the selected one or more device monitoring parameters, store the device monitoring data in one of a log database and a metric database at the cloud device management system, wherein the device monitoring parameter classification includes at least one or more of a log and a metric type; execute one or more device monitoring data based operations on the device monitoring data stored in at least one or more of the log database and the metric database; and display the result of execution at a console of the cloud device management system, wherein the cloud device management system includes a platform-as-a-service framework for cloud robotics solution provider.

12. The computer system according to claim 11, wherein the processor further executes the instructions to: receive a request to onboard the device at the cloud device management system; based on the received request, generate a unique device setup address to on board the device on to the cloud device management system, wherein the unique device setup address includes an authorization token to verify identity of the device and determines whether the device has the required OS and one or more software components for retrieving the device monitoring data; based on the determination, execute the unique device setup address on the verified device; and based on the execution, install a control plane slave on the device in communication with a control plane master at the cloud device management system, wherein installing the control plane slave on the device in communication with the control plane master at the cloud device management system includes: establishing a handshake between the control plane slave and the control plane master at the cloud device management system, and whitelisting the device for communication with the cloud device management system.

13. The computer system according to claim 11, wherein the processor further executes the instructions to: execute a client configuration file at the control plane slave on the device; and based on the execution, install a device manager client in communication with the control plane slave, a software service manager to manage execution of software service deployed on the device, and a communicator to publish the device monitoring data to the message broker at the cloud device management system.

14. The computer system according to claim 11, wherein the processor further executes the instructions to: retrieve device monitoring data from the device; receive the retrieved device monitoring data from the data retriever; generate a device monitoring metadata based on the device monitoring parameter classification, wherein the device monitoring metadata includes an identifier for managing the device, the device monitoring metadata provided in a format recognized by the message broker; publish the device monitoring data and the device monitoring metadata as a topic for accessing the device monitoring data at the message broker; and subscribe to the message broker for receiving the device monitoring data from the message broker at the cloud device management system.

15. The computer system according to claim 14, wherein the processor further executes the instructions to: receive a request to view statistical data for the metric data stored at the metric database; based on the received request, retrieve the metric data and corresponding time stamp from the metric database; and render the statistical data based on the retrieved metric data and the corresponding timestamp.

16. A non-transitory computer readable medium encoded with instructions that when executed by at least one computer causes the computer to: send a selection of one or more device monitoring parameters from a plurality of device monitoring parameters exposed by a device, wherein the device is a robot; receive device monitoring data corresponding to the selected one or more device monitoring parameters exposed from the device, wherein the device monitoring data includes log data and metrics data, the log data and metrics data used for device monitoring data based operations, the log data including a data record of events that occur at least in one of an operating system, software, or hardware running on the device; based on a device monitoring parameter classification of the selected one or more device monitoring parameters, store the device monitoring data in one of a log database and a metric database at the cloud device management system, wherein the device monitoring parameter classification includes at least one or more of a log and a metric type; execute one or more device monitoring data based operations on the device monitoring data stored in at least one or more of the log database and the metric database; and display the result of execution at a console of the cloud device management system, wherein the cloud device management system includes a platform-as-a-service framework for cloud robotics solution provider.

17. The non-transitory computer readable medium according to claim 16 further including instructions which when executed by a computer causes the computer to: receive a request to onboard the device at the cloud device management system; based on the received request, generate a unique device setup address to onboard the device on to the cloud device management system, wherein the unique device setup address includes an authorization token to verify identity of the device and determine whether the device has the required OS and one or more software components for retrieving the device monitoring data; based on the determination, execute the unique device setup address on the verified device; and based on the execution, install a control plane slave on the device in communication with a control plane master at the cloud device management system, wherein installing the control plane slave on the device in communication with the control plane master at the cloud device management system includes: establishing a handshake between the control plane slave and the control plane master at the cloud device management system, and whitelisting the device for communication with the cloud device management system.

18. The non-transitory computer readable medium according to claim 16 further including instructions which when executed by the computer causes the computer to: execute a client configuration file at the control plane slave on the device; and based on the execution, install a device manager client in communication with the control plane slave, a software service manager to manage execution of software service deployed on the device, and a communicator to publish the device monitoring data to the message broker at the cloud device management system.

19. The non-transitory computer readable medium according to claim 16 further including instructions which when executed by a computer causes the computer to: retrieve device monitoring data from the device; receive the retrieved device monitoring data from the data retriever; generate a device monitoring metadata based on the device monitoring parameter classification, wherein the device monitoring metadata includes an identifier for managing the device, the device monitoring metadata provided in a format recognized by the message broker; publish the device monitoring data and the device monitoring metadata as a topic for accessing the device monitoring data at the message broker; and subscribe to the message broker for receiving the device monitoring data from the message broker at the cloud device management system.

20. The non-transitory computer readable medium according to claim 19 further including instructions which when executed by a computer causes the computer to: receive a request to view statistical data for the metric data stored at the metric database; based on the received request, retrieve the metric data and corresponding time stamp from the metric database; and render the statistical data based on the retrieved metric data and the corresponding timestamp.

21. A computer implemented method to manage a plurality of devices, the method comprising: sending a selection of one or more device monitoring parameters from a plurality of device monitoring parameters exposed by a device, wherein the device is a robot; receiving device monitoring data corresponding to the selected one or more device monitoring parameters exposed by the device, wherein the device monitoring data includes log data and metrics data, the log data and metrics data used for device monitoring data based operations, the log data including a data record of events that occur at least in one of an operating system, software, or hardware running on the device; based on a device monitoring parameter classification of the selected one or more device monitoring parameters, storing the device monitoring data in one of a log database and a metric database at a cloud device management system, wherein the cloud device management system includes a platform-as-a-service framework; executing one or more device monitoring data based operations based on the device monitoring data stored in one of the log database and the metric database; and displaying the result of execution, at a console of the cloud device management system, wherein the method further comprising: sending a web server certificate of a web server to a control plane slave to whitelist the web server at the control plane slave; sending a device certificate to whitelist the device at a web server included at the cloud device management system; establishing a connection with the web server based on a web address of the web server using a random port address; sending the random port address to the web server; opening a reverse SSH-tunnel between the cloud device management system and the device using the random port address; and based on the opened reverse SSH-tunnel, providing the console a remote access to the device.

* * * * *